United States Patent
Lee et al.

(10) Patent No.: US 6,404,554 B1
(45) Date of Patent: Jun. 11, 2002

(54) OPTICAL PHASE GRATING LOW PASS FILTER

(75) Inventors: Jae Chul Lee, Seoul; Sung Woo Lim, Chonlabuk-Do; Chun Soo Ko, Daejeon; Shi Ho Kim, Daejeon; Yong Ho Oho, Daejeon, all of (KR)

(73) Assignee: Havit Co., Ltd., Daejeon (KR)

( * ) Notice: Subject to any disclaimer, the term of this patent is extended or adjusted under 35 U.S.C. 154(b) by 0 days.

(21) Appl. No.: 09/573,269

(22) Filed: May 18, 2000

(30) Foreign Application Priority Data

Oct. 27, 1999 (KR) .............................. 99-46950

(51) Int. Cl.[7] .............................................. G02B 27/44
(52) U.S. Cl. ..................... 359/576; 359/350; 359/558; 359/566
(58) Field of Search ................ 359/558, 566, 359/569, 575, 576, 563, 568, 350; 348/340, 342

(56) References Cited

U.S. PATENT DOCUMENTS

| | | | | |
|---|---|---|---|---|
| 4,093,346 A | * | 6/1978 | Nishino et al. | 359/885 |
| 4,472,735 A | * | 9/1984 | Shinozaki et al. | 35/628 |
| 5,434,709 A | * | 7/1995 | Yamada et al. | 359/569 |
| 5,467,224 A | * | 11/1995 | Ohnishi et al. | 359/614 |
| 5,589,882 A | * | 12/1996 | Shiraishi et al. | 348/340 |
| 5,737,050 A | * | 4/1998 | Takahara et al. | 349/10 |
| 5,755,501 A | * | 5/1998 | Shinohara et al. | 359/558 |
| 5,793,544 A | * | 8/1998 | Ogihara et al. | 252/582 |
| 5,995,279 A | * | 11/1999 | Ogino et al. | 348/291 |
| 6,147,732 A | * | 11/2000 | Aoyama et al. | 349/112 |
| 6,225,244 B1 | * | 5/2001 | Oguma | 501/45 |

FOREIGN PATENT DOCUMENTS

| | | | | |
|---|---|---|---|---|
| JP | 0191319 | * | 8/1991 | 359/569 |
| WO | 0186166 | * | 7/1986 | 359/566 |

* cited by examiner

Primary Examiner—Cassandra Spyrou
Assistant Examiner—John Juba, Jr.
(74) Attorney, Agent, or Firm—Dykema Gossett PLLC

(57) ABSTRACT

There is provided an optical low pass filter passing only a lower spatial frequency using a phase grating and the structure of the grating. The optical low pass filter utilizes the two-dimensionally arranged phase grating for the purpose of removing an image with a higher spatial frequency in an imaging system employing a semiconductor solid-state imaging device such as CCD image sensor or CMOS image sensor, The optical low pass filter which suppresses a spatial frequency component higher than a specific frequency and passes a component lower than the specific frequency in an imaging system sensing input images includes a grating generating the phase shift of 0, a grating generating the phase shift of $\phi$, arranged at the right and bottom of the 0-phase shift grating, and a grating generating the phase shift of $2\phi$, arranged at the diagonal side of the 0-phase shift grating.

4 Claims, 15 Drawing Sheets

X:DISTANCE BETWEEN PICTURE ELEMENTS IN x-DIRECTION
Y:DISTANCE BETWEEN PICTURE ELEMENTS IN y-DIRECTION

OPERATION OF THREE-PLATE DOUBLE REFRACTION FILTER=
4-BEAM SPLITTER

OPTICAL PHASE GRATING LOW PASS FILTER

BACKGROUND OF THE INVENTION

1. Field of the Invention

The present invention relates to an imaging system utilizing a solid-state imaging device and, more particularly, to a method of constructing an optical low pass filter passing only a lower spatial frequency using a phase grating and the structure of the grating. The present invention provides a method for removing an image with a higher spatial frequency using a two-dimensionally arranged phase grating. The invention proposes a method of constructing the optical low pass filter employing the two-dimensionally arranged phase grating for the purpose of removing an image with a higher spatial frequency in an imaging system utilizing a semiconductor solid-state imaging device such as CCD image sensor or CMOS image sensor, and provides structures of the grating for realizing the proposed optical low pass filter.

2. Description of the Related Art

In a charge coupled device (CCD) image sensor currently widely used as an image sensor or CMOS image sensor that has been used since 90s, the image sensors configured of light receiving elements are two-dimensionally arranged to convert input images into electrical signals. FIG. 1 shows an ideal sampling in case where the repetitive period of the light receiving element is X in direction x and Y in the direction y in the two-dimensional image sensor. If an image having the spatial frequency spectrum of FIG. 2A is imaged using the two-dimensional sensor having the spatial sampling characteristic of FIG. 1, the sampled image has the spatial frequency spectrum of FIG. 2B in which the original image's spatial frequency spectrum is repeated. In FIG. 2B, the frequency spectrum of the sampled image has a repetitive period corresponding to the reciprocal of the sampling interval, that is, 1/X in the x-direction and 1/Y in the y-direction. Accordingly, to restore the image inputted to the two-dimensional image sensor to the original state, it requires an optical low pass filter which passes the spectrum corresponding to one period starting from the starting point but cuts off a spatial frequency higher than this.

FIG. 3 shows the configuration of a conventional camcorder or digital camera system. A motion picture or still picture 1 to be imaged is focused by an optical lens arrangement 2 and then passes through an optical low pass filter 3 to enter a light receiving element constructed on the surface of an image sensor 4. The optical lens arrangement 2 consists of appropriate optical lenses such as concave lens and convex lens in order to focus the input image 1 on the imaging device. The optical lens arrangement 2 of FIG. 3 usually includes an UV filter or IR filter for respectively blocking ultraviolet rays or infrared rays contained in the input image. The UV or IR filter is generally constructed in a manner that an appropriate material is coated on a lens or a transparent glass plate.

As described above, to restore the image inputted to the solid-state imaging device to the original state, it is ideal that the optical low pass filter 3 of FIG. 3 has a cutoff frequency that is one-half the sampling spatial frequency. Here, the sampling spatial frequency corresponds to the reciprocal of the repetitive period of the light receiving element of the solid-state imaging device. That is, in the two-dimensional light receiving element arrangement of FIG. 1, $f_s=1/d$ and $f_c=f_s/2=1/2d$, where d is X in the x-direction and Y in the y-direction. Here, $f_s$ represents the sampling frequency and $f_c$ represents the cutoff frequency of an ideal optical low pass filter.

FIG. 4 shows the spatial frequency transfer characteristic of the optical lens arrangement. The frequency band defined by a dotted line in FIG. 4 is the frequency transfer function of an ideal optical low pass filter. The maximum transfer frequency of the lens, $f_m$, is $2(NA/\lambda)$. Here, NA represents the numerical aperture of the lens and $\lambda$ represents the wavelength of incident light. Though the lens functions as a kind of optical low pass filter, its maximum cutoff frequency, $f_m$, is usually considerably higher than the ideal cutoff frequency, $f_c$, of the low pass filter as shown in FIG. 4. The frequency transfer characteristic of the lens can approximate to the straight line of FIG. 4 to be mathematically modeled, and the difference between the approximate value indicated by the straight line and the actual transfer characteristic becomes smaller as $f_m$ becomes larger than $f_c$.

FIGS. 5A, 5B and 5C illustrate conventional optical low pass filters utilizing a double refraction plate, which are currently widely used as an optical low pass filter. Referring to FIG. 5A, an input beam incident on one surface of the double refraction plate is split into two beams, having a distance, $d_n$, therebetween, while it passes through the double refraction plate. The relation among the thickness and refraction index of the double refraction plate and the distance, $d_n$, satisfies the following equation:

$$d_n = \frac{t(n_e^2 - n_o^2)}{2n_e n_o}$$

where t is the thickness of the double refraction plate, $n_e$ is the extra-ordinary refraction index and $n_o$ is the ordinary refraction index. As shown in FIG. 5B, the conventional optical low pass filter utilizing the double refraction plate is constructed in such a manner that an x-directional double refraction plate and y-directional double refraction plate lie in piles to enable beam splitting in the x-direction and y-direction. An IR removal filter is generally inserted between the two double refraction plates.

In the operation of the conventional optical low pass filter utilizing the double refraction plate, the input beam, vertically incident on the surface of the filter, is split into two beams at the x-directional double refraction plate, and each of these two beams is further split into two beams at the y-direction double refraction plate. Thus, one input beam is split into four beams, arriving at the light receiving element of the solid-state imaging device. That is, the optical low pass filter using the double refraction plate functions as a 4-beam splitter as shown in FIG. 5C. By splitting one input beam into four beams, an image having a higher spatial frequency is converted into a lower spatial frequency before sampling of the solid-state imaging device.

The general optical transfer characteristic function of 2-plate type double refraction plate is equals to the magnitude of the absolute value of the cosine function with the period of $1/d_n$ when it is Fourier-transformed. That is, the transfer function has a value proportional to $abs(\cos(2\pi \times f \times d_n))$ where f is spatial frequency and $d_n$ is the distance between the beams split by the double refraction plate.

FIG. 6 shows the optical transfer function of the double refraction plate filter when $d_n=d$. The optical transfer function of an image which passes through the optical lens to reach the double refraction plate filter is obtained by multiplying the transfer function of the lens shown in FIG. 4 by the transfer function of the double refraction plate. The optical transfer function corresponds to the solid line of FIG. 6.

In case where the double refraction plate is applied to the conventional imaging system utilizing the solid-state imaging device, larger loss generates in the transfer function in a spatial frequency band lower than the cutoff frequency than in the ideal optical low pass filter. This loss deteriorates the resolution of the image sensor. Furthermore, there exists a periodic transfer function in a spatial frequency band higher than the cutoff frequency so that a higher frequency component cannot be removed. This generates aliasing to thereby bring about afterglow. In other words, the optical low pass filter utilizing the double refraction plate has larger loss in a lower band and larger surplus portion in a higher band, resulting in deterioration of resolution and poor effect on the removal of afterglow.

There have been proposed optical phase grating low pass filters having various structures as shown in FIGS. 7A to 7E for the purpose of improving the performance of the conventional optical low pass filter using the double refraction plate. FIG. 7A shows the vertical grating filter described in U.S. Pat. No. 4,083,627, FIG. 7B represents the circular grating filter proposed in U.S. Pat. No. 4,083,627, and FIG. 7C illustrates the lozenge-shaped grating filter disclosed in U.S. Pat. No. 4,009,939. FIG. 7D shows the parallel repetitive grating filter proposed in U.S. Pat. No. 4,795,236 and No. 4,178,611, and FIG. 4E illustrates the optical phase grating low pass filter constructed in a manner that gratings having a refraction index different from that of a grating substrate whose both surfaces are used are repeatedly arranged in parallel, disclosed in U.S. Pat. No. 4,795,236.

However, most of the aforementioned optical phase grating low pass filters are not being actually utilized since they could not be manufactured. This is because the optical phase grating low pass filters of FIGS. 7A to 7E have the structures that two gratings having different phase shifts from each other are two-dimensionally arranged. Thus, according to computer simulation and Fourier transform carried out by this inventor, their performances are not remarkably improved compared to the conventional low pass filter using the double refraction plate. That is, the conventional optical phase grating low pass filter has the disadvantage that the transfer characteristic of the spatial frequency spectrum is not much improved compared to the conventional filter utilizing the double refraction plate because the optical phase grating low pass filter has the two gratings having different phases. This is why the optical phase grating low pass filter proposed for the purpose of improving the conventional optical low pass filter using the double refraction plate cannot be practically utilized.

SUMMARY OF THE INVENTION

It is, therefore, an object of the present invention to provide an optical phase grating low pass filter which increases the optical transfer function at a frequency band lower than the ideal cutoff frequency corresponding to one-half the sampling spatial frequency of a solid-state imaging device but suppresses the transfer function at a band higher than the cutoff frequency.

To accomplish the object of the present invention, there is provided an optical low pass filter which suppresses a spatial frequency component higher than a specific frequency and passes a component lower than the specific frequency in an imaging system sensing input images, the optical low pass filter comprising: a 0-phase shift grating for generating the phase shift of 0; a $\phi$-phase shift grating for generating the phase shift of $\phi$, arranged at the right and bottom of the 0-phase shift grating; and a 2$\phi$-phase shift grating for generating the phase shift of 2$\phi$, arranged at the diagonal side of the 0-phase shift grating.

To accomplish the object of the present invention, there is provided an optical low pass filter which suppresses a spatial frequency component higher than a specific frequency and passes a component lower than the specific frequency in an imaging system sensing input images, the optical low pass filter comprising: a plurality of basic arrangement patterns periodically arranged, wherein each of the basic arrangement pattern consists of: a 0-phase shift grating for generating the phase shift of 0; a $\phi$-phase shift grating for generating the phase shift of $\phi$, arranged at the right and bottom of the 0-phase shift grating; and a 2$\phi$-phase shift grating for generating the phase shift of 2$\phi$, arranged at the diagonal side of the 0-phase shift grating.

To accomplish the object of the present invention, there is also provided an optical low pass filter which suppresses a spatial frequency component higher than a specific frequency and passes a component lower than the specific frequency in an imaging system sensing input images, the optical low pass filter comprising: a plurality of basic arrangement patterns periodically arranged, wherein each of the basic arrangement pattern consists of: a $\phi$-phase shift grating for generating the phase shift of $\phi$, having a predetermined thickness and formed on a transparent grating substrate; a 2$\phi$-phase shift grating for generating the phase shift of 24, having a thickness twice of the $\phi$-phase shift grating and formed on the same grating substrate; and a portion for generating the phase shift of 0, having no grating.

To accomplish the object of the present invention, there is also provided An optical low pass filter which suppresses a spatial frequency component higher than a specific frequency and passes a component lower than the specific frequency in an imaging system sensing input images, the optical low pass filter comprising: a first grating for generating the phase shift of $\phi$, having a predetermined thickness and periodically arranged on one transparent grating substrate in the horizontal direction; and a second grating for generating the phase shift of $\phi$, having a predetermined thickness and periodically arranged on the other transparent grating substrate in the vertical direction, wherein the surfaces of the first and second gratings are attached to each other facing each other, to thereby construct a structure in which a $\phi$-phase shift grating for generating the $\phi$-phase shift, a 2$\phi$-phase shift grating for generating the 2$\phi$-phase shift, and a 0-phase shift grating are periodically arranged between the two transparent grating substrates.

The optical low pass filter has a filter for blocking UV rays or IR rays which is formed on one of the top and bottom faces of the attached grating substrate structure. The optical low pass filter may have a filter for blocking UV rays or IR rays which is formed on each of the top and bottom faces of the attached grating substrate structure. The optical low pass filter also may have a filter for blocking UV rays which is formed on one of the top and bottom faces of the attached grating substrate structure, and a filter for blocking IR rays which is formed on the other face.

To accomplish the object of the present invention, there is provided An optical low pass filter which suppresses a spatial frequency component higher than a specific frequency and passes a component lower than the specific frequency in an imaging system sensing input images, the optical low pass filter comprising: a first grating for generating the phase shift of $\phi$, having a predetermined thickness and periodically arranged on one transparent grating substrate in the horizontal direction; and a second grating for generating the phase shift of $\phi$, having a predetermined thickness and periodically arranged on the other transparent grating substrate in the vertical direction, wherein the surfaces of the two grating substrates on which the gratings are not formed are attached to each other facing each other, to thereby construct a structure in which a φ-phase shift grating for generating the φ-phase shift, a 2φ-phase shift grating for generating the 2φ-phase shift and a 0-phase shift grating are periodically arranged.

The optical low pass filter has a filter for blocking UV rays or IR rays which is inserted between the attached surfaces of the two grating substrates.

To accomplish the object of the present invention, there is also provided An optical low pass filter which suppresses a spatial frequency component higher than a specific frequency and passes a component lower than the specific frequency in an imaging system sensing input images, the optical low pass filter comprising: a first grating for generating the phase shift of φ, having a predetermined thickness and periodically arranged on one surface of a transparent grating substrate in the horizontal direction; and a second grating for generating the phase shift of φ, having a predetermined thickness and periodically arranged on the other surface of the transparent grating substrate in the vertical direction, wherein the first and second gratings and the grating substrate are formed of materials having the same refraction index, to thereby construct a structure in which a φ-phase shift grating for generating the φ-phase shift, a 2φ-phase shift grating for generating the 2φ-phase shift, and a 0-phase shift grating are periodically arranged.

DETAILED DESCRIPTION OF THE PREFERRED EMBODIMENT

Figure 8A:
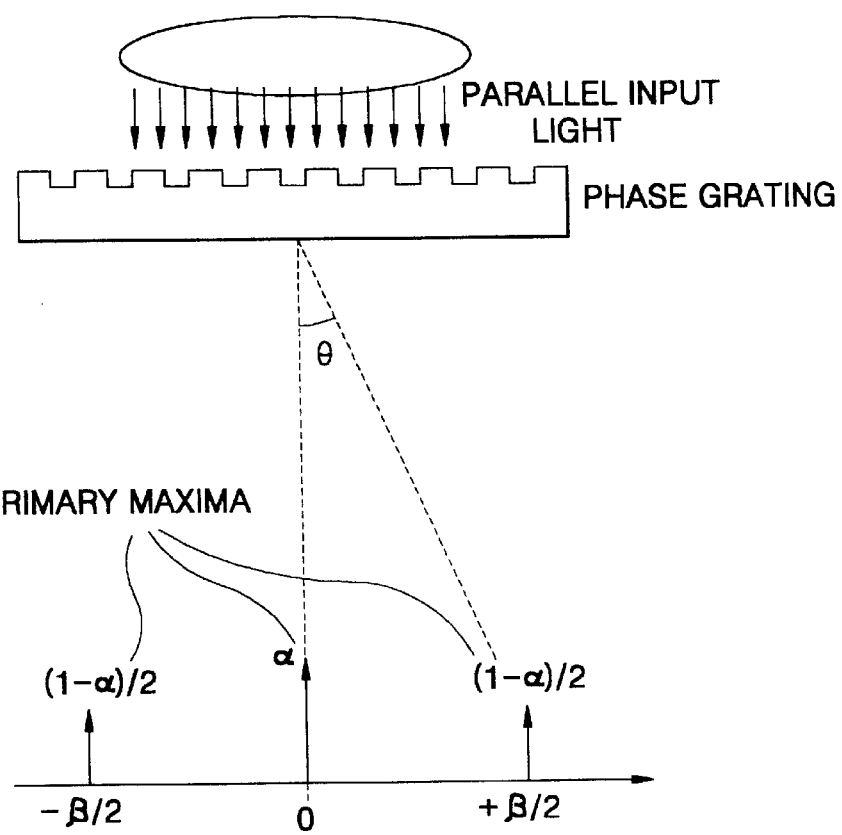
FIGS 8A and 8B are diagrams showing the one-dimensional basic conception of an optical phase grating low pass filter according to the present invention.
Figure 8B:
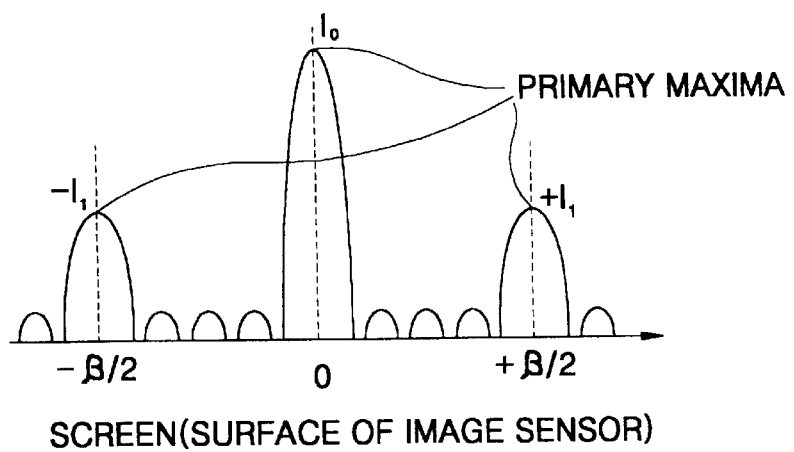

FIGS. 8A and 8B are diagrams showing the one-dimensional basic conception of an optical low pass filter using a phase grating according to the present invention. The surface of the phase grating has a grating with a prominence and depression having a predetermined repetitive period. The phase difference between the vertical prominence portion and depression portion of the phase grating for the light transmitted through the grating corresponds to a specific phase shift, φ, determined by the thickness of the grating. It is preferable that the prominence has the same refraction index as that of the grating substrate in order to minimize the reflection of incident light.

In the optical transfer characteristic of the one-dimensional grating of the invention, when the parallel light, vertically incident on the surface of the grating, arrives at the surface of the image sensor, as shown in FIG. 8, the light has the principal maxima of 0, +1 and −1 and has lower optical transfer characteristic at a region other than the principal maxima. Here, when the light intensity of the 0-principal maximum is a, the beams of +1 and −1 are located at points distant from +β/2 and −β/2 from the starting point, respectively, and their intensities become to $$\frac{1-\alpha}{2}.$$

The spatial transfer characteristic of the grating of FIG. 8 is expressed by the following equation:

$$I(x)=\alpha\delta(x)+0.5(1-\alpha)[\delta(x-\beta/2)+\delta(x+\beta/2)]$$

where $\delta(x)$ represents an impulse function. When the spatial transfer characteristic, $I(x)$, is Fourier-transformed, the frequency transfer function ($L_G$) of the one-dimensional phase grating filter of the present invention can be obtained. $L_G$ is given by the following equation:

$$L_G(f)=\alpha+(1-\alpha)\cos(\pi\beta f)$$

Figure 1:
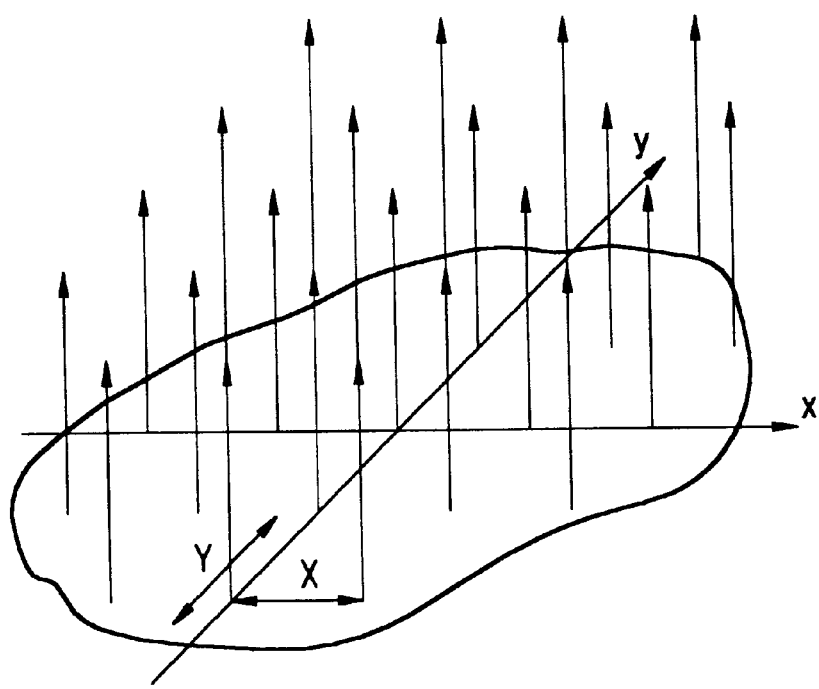
FIG. 1 is diagram for explaining an ideal sampling in a conventional CCD or CMOS solid-state imaging device.
Figure 2A:
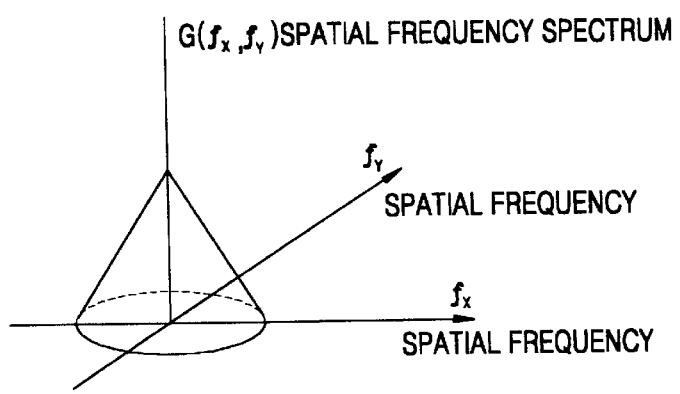
FIG. 2A is a characteristic diagram of frequency transfer function according to the ideal sampling of the two-dimensional solid-state imaging device of FIG. 1, showing original function characteristic before the sampling.
Figure 2B:
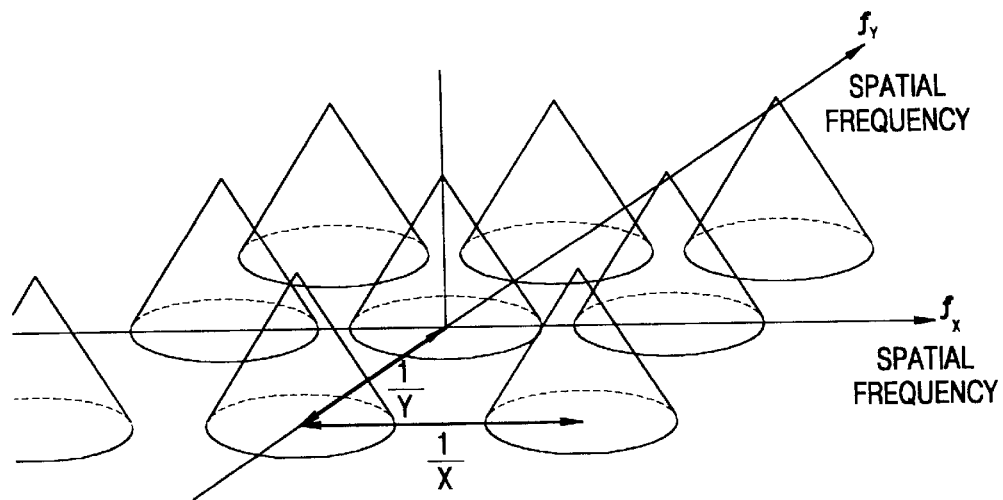
FIG. 2B is a characteristic diagram of frequency transfer function according to the ideal sampling of the two-dimensional solid-state imaging device of FIG. 1, showing transfer function characteristic after the sampling.
Figure 3:
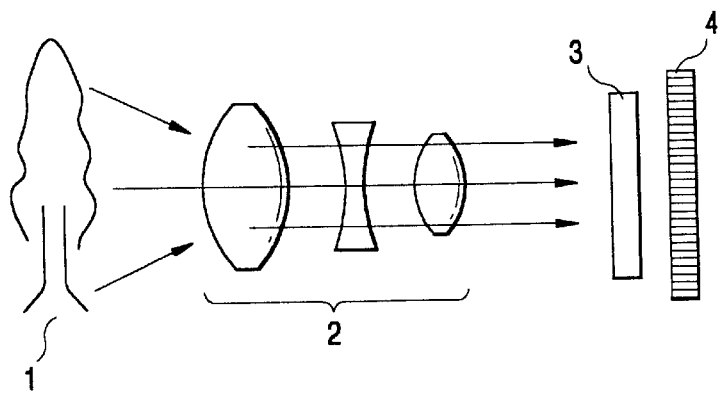
FIG. 3 is a diagram showing the configuration of a conventional imaging system.
Figure 4:
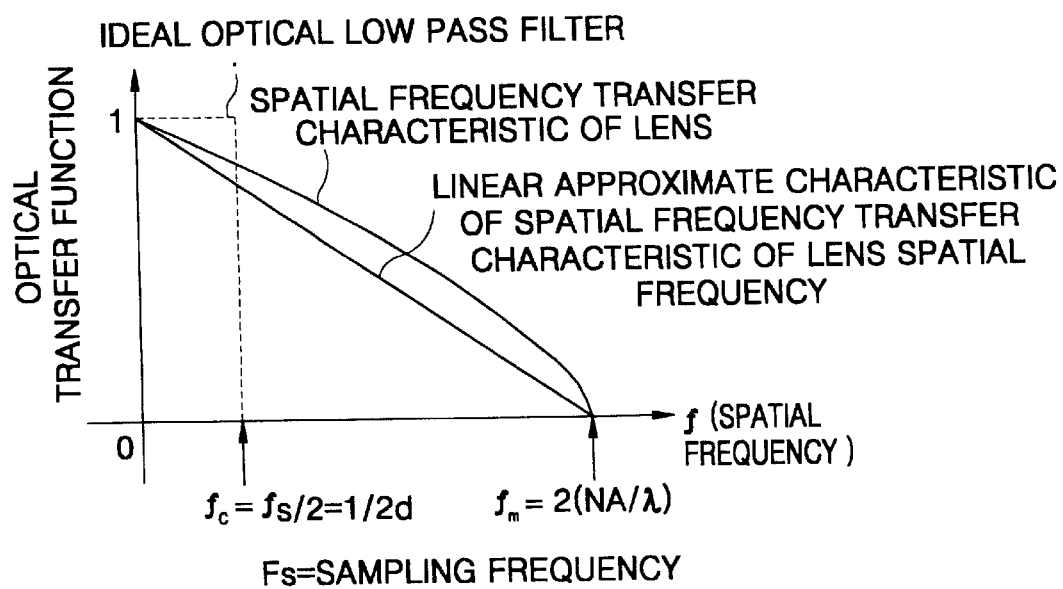
FIG. 4 is a function characteristic diagram showing the spatial frequency transfer characteristic of a conventional optical lens.
Figure 5A:
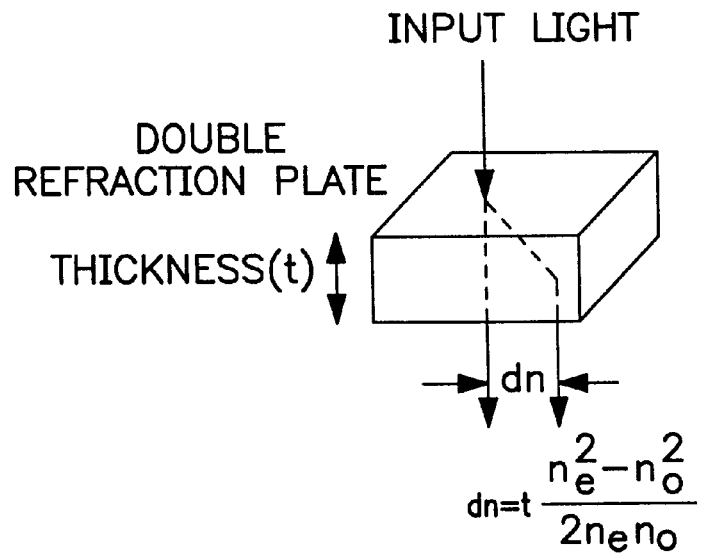
FIG. 5A is a diagram showing the configuration of a conventional optical low pass filter utilizing a double refraction plate, for explaining the diffraction characteristic of the double refraction plate.
Figure 5B:
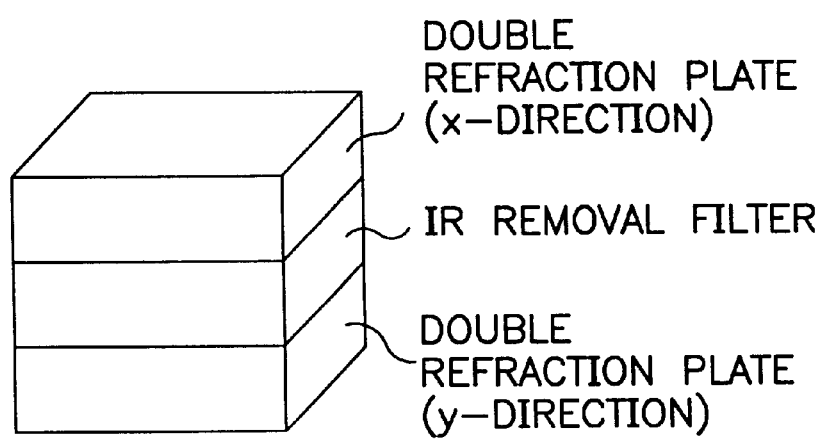
FIG. 5B is a diagram showing the configuration of a conventional optical low pass filter utilizing a 3-plate type double refraction plate.
Figure 5C:
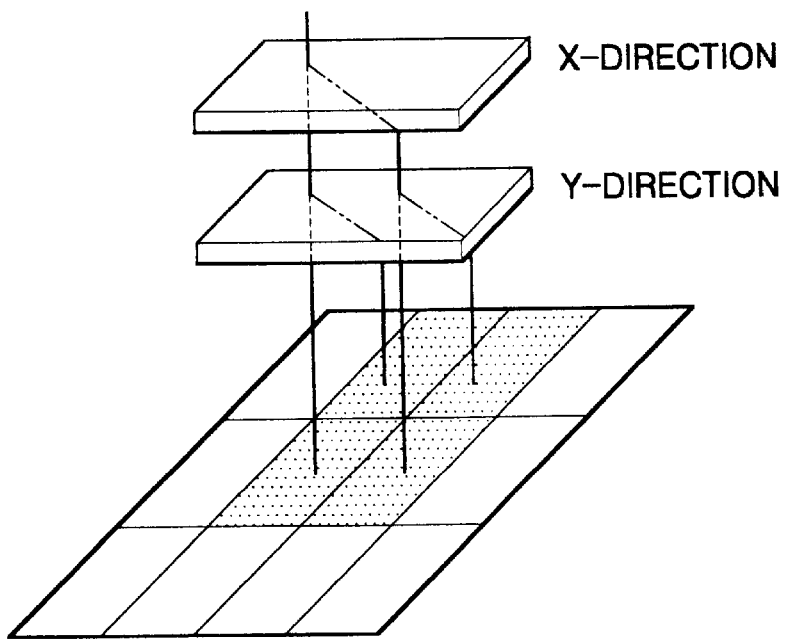
FIG. 5C is a diagram showing the configuration of the conventional optical low pass filter utilizing the double refraction plate, illustrating the operation characteristic of the conventional double refraction plate filter.
Figure 6:
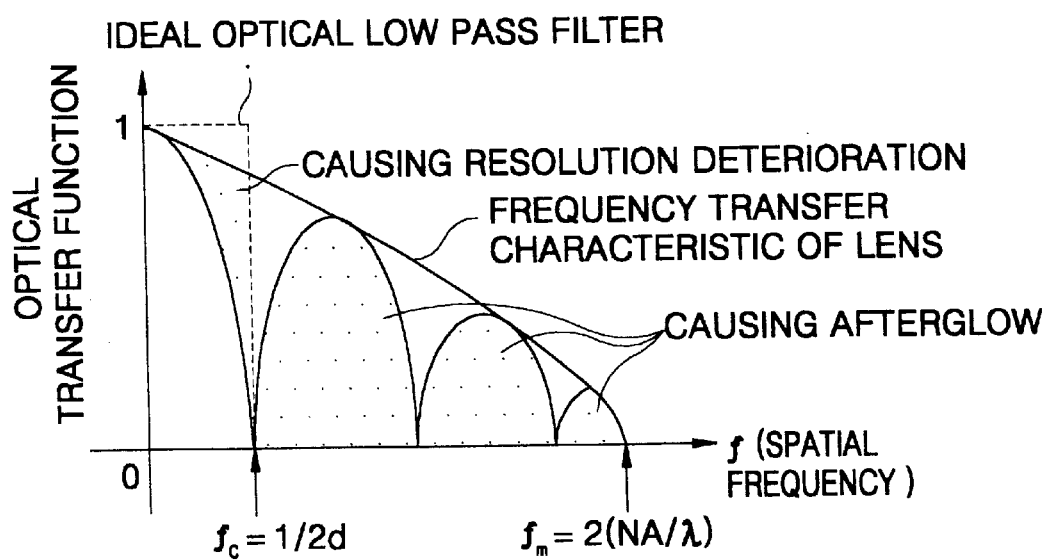
FIG. 6 is a diagram for explaining the frequency transfer function and optical functions of the conventional double refraction plate filter.
Figure 7A:
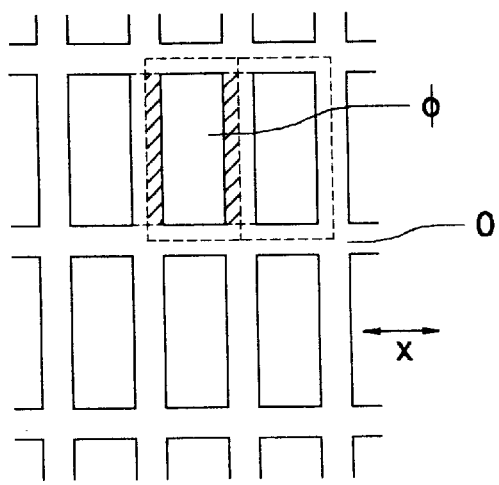
FIG. 7A is an exemplary diagram of a conventional optical phase grating low pass filter, which is a vertical grating filter.
Figure 7B:
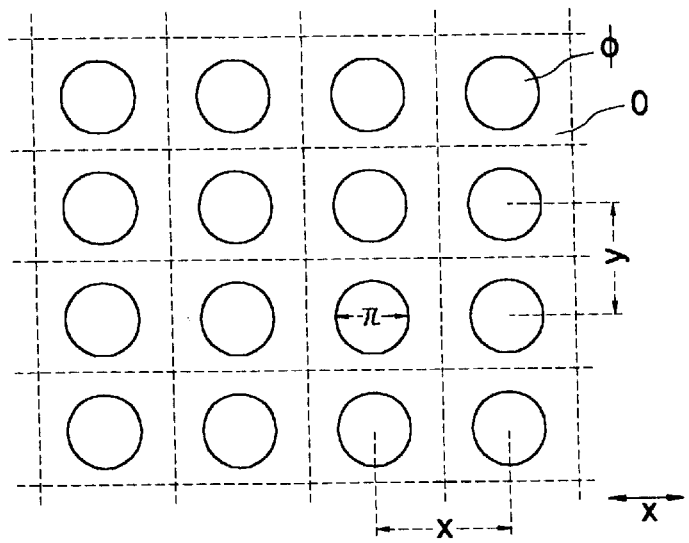
FIG. 7B is an exemplary diagram of a conventional optical phase grating low pass filter, which is a circular grating filter.
Figure 7C:
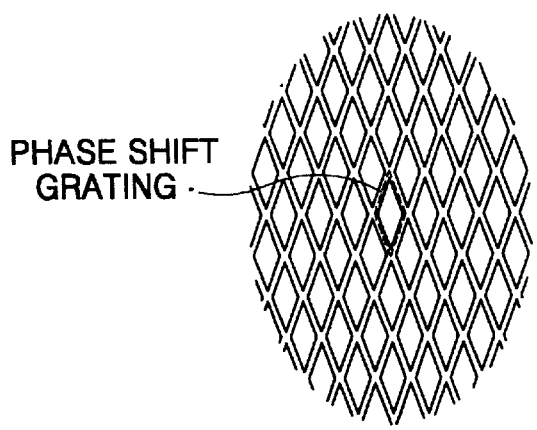
FIG. 7C is a exemplary diagram of a conventional optical phase grating low pass filter, which is a lozenge-shaped grating filter.
Figure 7D:
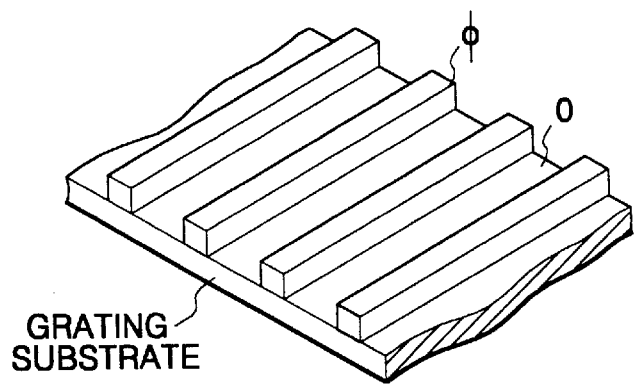
FIG. 7D is an exemplary diagram of a conventional optical phase grating low pass filter, which is a parallel repetitive filter.
Figure 7E:
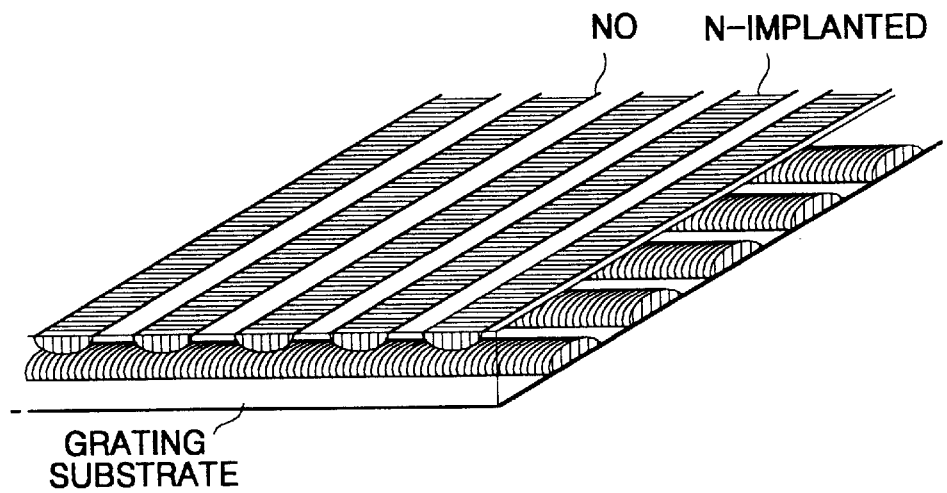
FIG. 7E is an exemplary diagram of a conventional optical phase grating low pass filter, which is a parallel repetitive filter utilizing both surfaces of a grating whose refractive index is different from that of a substrate.

FIG. 8B shows the frequency transfer characteristic. In FIG. 8B, small values between the principal maxima can be ignored compared to the values of the principal maxima. There will be obtained below the value a for minimizing the difference between the ideal characteristic of the optical low pass filter and the actual frequency characteristic of the low pass filter. When let the difference between the ideal characteristic and actual characteristic be Δ, $$\Delta = \int_0^{fm} (L_{ideal} - L_{lense} \times L_G)^2 df$$

where f is the spatial frequency, $f_m$ is the maximum spatial transfer frequency of the lens, $L_{ideal}$ is the ideal transfer characteristic of the optical low pass filter, $L_{lens}$ is the transfer characteristic of the lens, and $L_G$ is the frequency transfer characteristic of the phase grating of the present invention. As shown by the dotted line in FIG. 4, $L_{ideal}$ becomes 1 when the spatial frequency is lower than the ideal cutoff frequency $f_c$ of the optical low pass filter and 0 when larger than $f_c$. That is, $L_{ideal}=1$, $f<f_c$ and $L_{ideal}=0$, $f\geq L_c$. $L_{lens}$ can be represented by the equation, $L_{lens}=1-f/f_m$, if it is assumed that the transfer characteristic is linear when its $f_m$ is very larger than $f_c$.

It can be known that Δ has a value proportional to $f_m[\alpha^2+0.5(1-\alpha)^2]$ when Δ is obtained by applying the formula of $L_{ideal}$, $L_{lens}$ and $L_G$ to the above-described integral equation. Here, the value α a for minimizing Δ becomes ⅓. Consequently, in order to minimize the difference between the ideal filter characteristic and the actual characteristic of the optical phase grating low pass filter of the invention, the input beam must be equally split into the three principal maxima of 0, +1 and −1.

Figure 9:
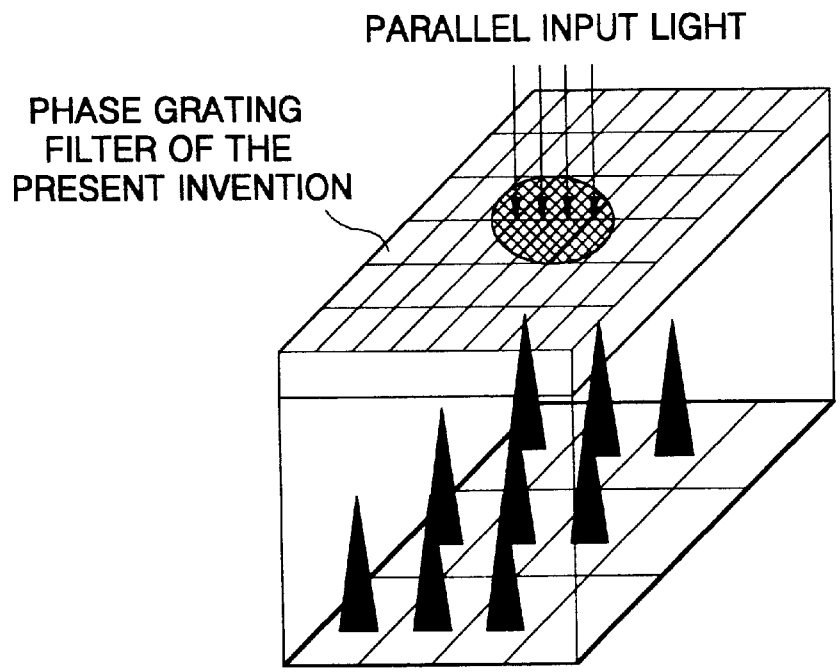
FIG. 9 is a diagram for explaining the operation of a two-dimensional optical phase grating low pass filter according to the present invention.

When the phase grating which equally splits input beam into three, designed by the preceding patent, is two-dimensionally arranged as shown in FIG. 9, the input beam is equally split into nine principal maxima. The two-dimensional grating of the present invention operates as the optical low pass filter because the input parallel beam is split into nine beams so that an image having the higher spatial frequency of the input beam into a lower frequency band.

Figure 10:
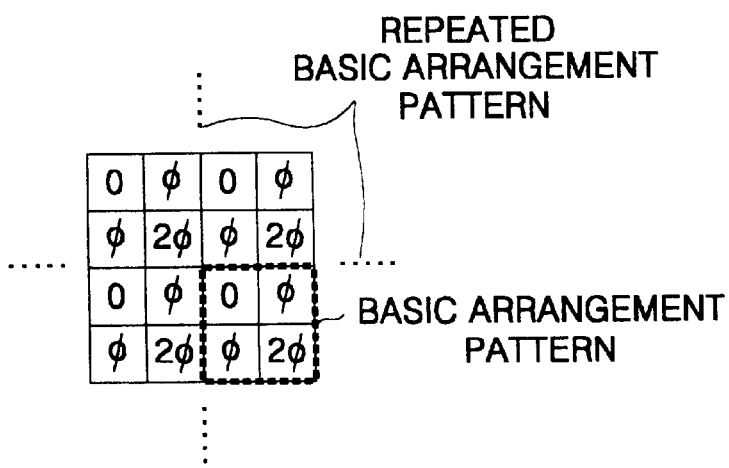
FIG. 10 is a diagram showing the arrangement of the phase grating of the optical phase grating low pass filter of the present invention.

FIG. 10 shows the phase grating arrangement of the present invention for equally splitting the input beam into nine. The basic arrangement is constructed in such a manner that a phase shift grating is arranged at the right and bottom of a 0-phase shift grating, adjacent thereto, and a 2-phase shift grating is located at the diagonal side of the 0-phase shift grating. This basic arrangement pattern is repeated to realize the optical low pass filter.

An Embodiment of the Invention

Figure 11A:
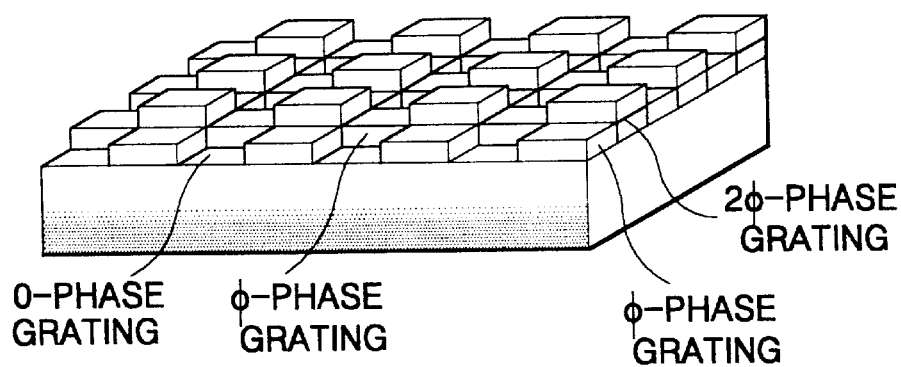
FIG. 11A is a schematic perspective diagram of a first embodiment of the phase grating structure of the optical phase grating low pass filter of the present invention.
Figure 11B:
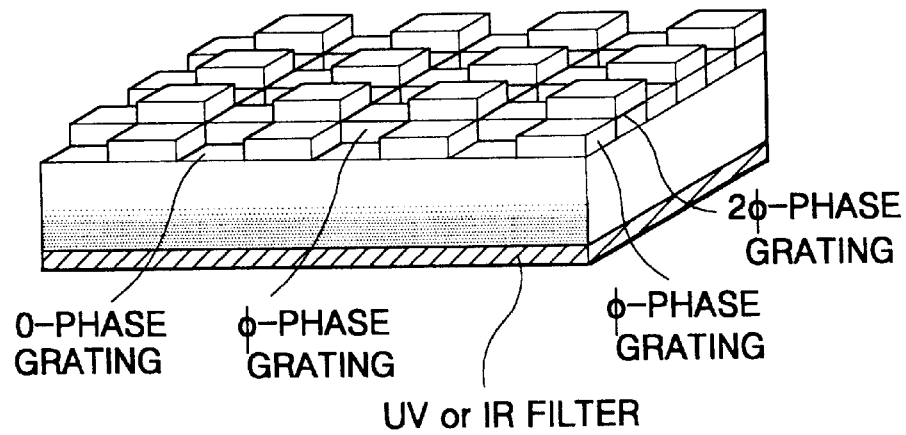
FIG. 11B is a schematic perspective diagram of the first embodiment of the grating structure of the optical phase grating low pass filter of the present invention, the phase grating being combined with an infrared or ultraviolet filter.

The phase shift difference in the optical phase-shift low pass filter of FIG. 10 is realized by arranging a grating having a specific thickness. FIGS. 11A and 11B illustrate a structure of the phase grating for realizing the configuration of FIG. 10. If a grating with a specific thickness generates the phase shift of φ, a grating with a thickness twice the specific thickness generates the phase shift of 2φ and a portion where there is no grating generates the phase shift of 0. The basic arrangement of the grating is constructed in such a manner that the φ-phase shift grating is placed at the right and bottom of the 0-phase shift grating, adjacent thereto, and the 2φ-phase shift grating with a thickness twice the φ-phase shift grating is located at the diagonal side of the 0-phase shift grating. This basic arrangement pattern is repeated to realize the optical low pass filter.

It is the most preferable that the phase shift gratings and the grating substrate are fabricated with materials having the same refraction index because light is reflected at the interface between materials having refraction indices different from each other. In fabrication of the phase shift grating of the invention, the thickness of the grating may be changed a little during the fabrication process. Even in this case, however, the thickness variation does not obstruct practical application of the present invention if error in the phase shift due to the grating is not larger than φ or 2φ. Accordingly, a very small error of phase shift due to a minute variation in the grating's thickness does not depart from the basic spirit and scope of the present invention.

Another Embodiment of the Invention

Figure 12A:
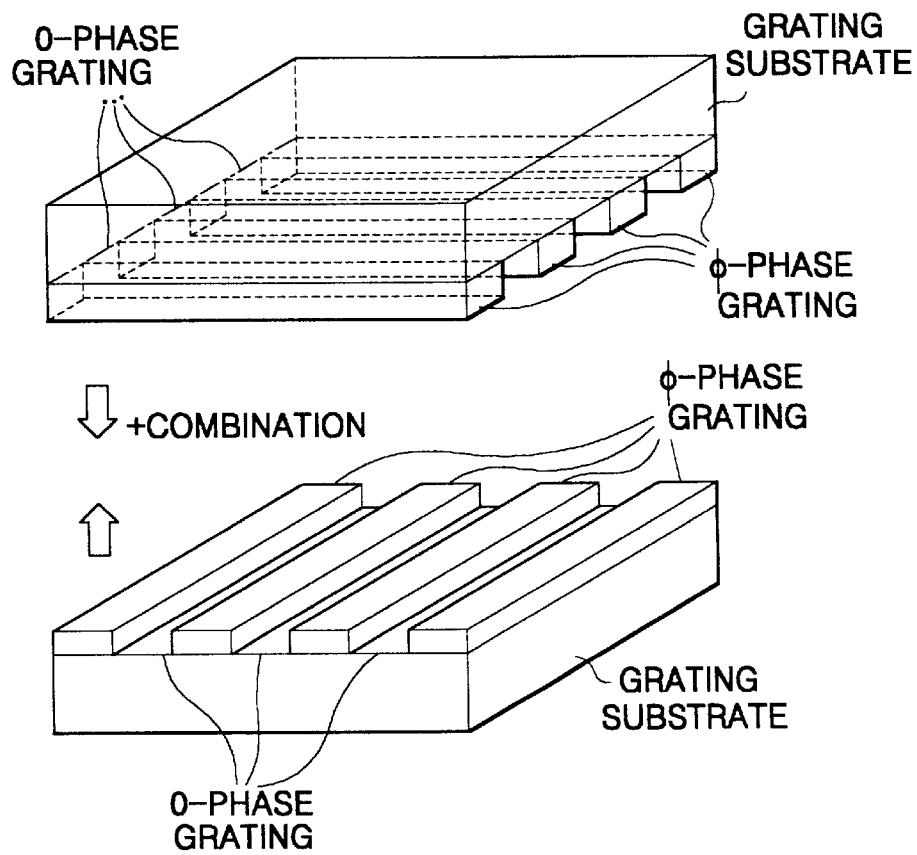
FIG. 12A is a schematic perspective diagram of a second embodiment of the grating structure of the optical phase grating low pass filter of the present invention before attachment.
Figure 12B:
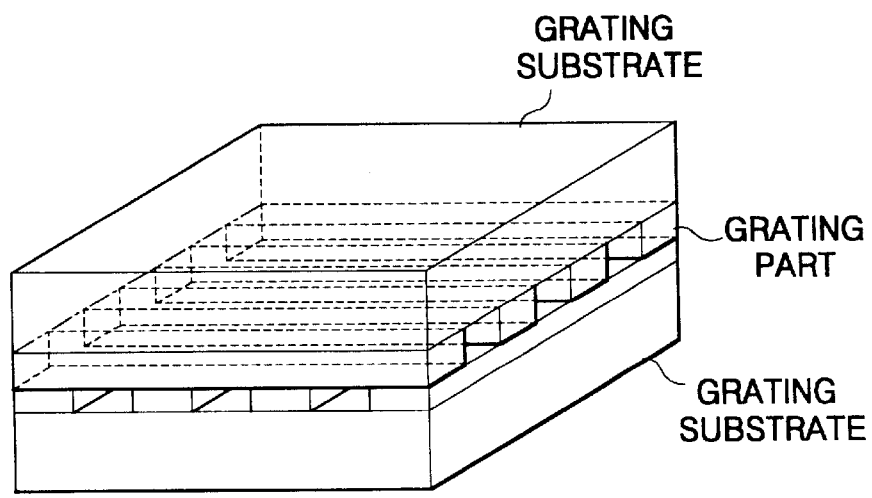
FIG. 12B is a schematic perspective diagram of the second embodiment of the grating structure of the optical phase grating low pass filter of the present invention after attachment.

FIGS. 12A and 12B show the second embodiment of the optical phase grating low pass filter of the present invention. To arrange the grating to have the phase shifts, 0, φ and 2φ as shown in FIG. 10, a grating for shifting the phase by φ is periodically arranged in parallel on a grating substrate in the direction y, a grating for shifting the phase by φ is periodically arranged in parallel on a grating substrate in the direction x, and the two grating surfaces are attached to each other, facing each other, to thereby construct the optical phase grating low pass filter. The grating and the substrate are preferably fabricated with materials having the same refraction index.

FIG. 12A shows the gratings which are respectively arranged in the directions x and y, and FIG. 12B shows the grating structure after the two gratings are attached to each other. According to the attachment of the two gratings, a portion where the 0-phase grating and 0-phase grating meet each other becomes a 0-shift grating part, a portion where the 0-phase grating and φ-phase grating or the φ-phase grating and 0-phase grating meet each other becomes a φ-phase grating part, and the φ-phase grating and φ-phase grating meet each other becomes a 2φ-phase grating part.

In fabrication of the phase shift grating of the invention, the thickness of the grating may be changed a little during the fabrication process. Even in this case, however, the thickness variation does not obstruct practical application of the present invention if the phase shift error due to the grating is not larger than φ. Accordingly, a very small error of phase shift due to a minute variation in the grating's thickness does not depart from the basic spirit and scope of the present invention.

Figure 13A:
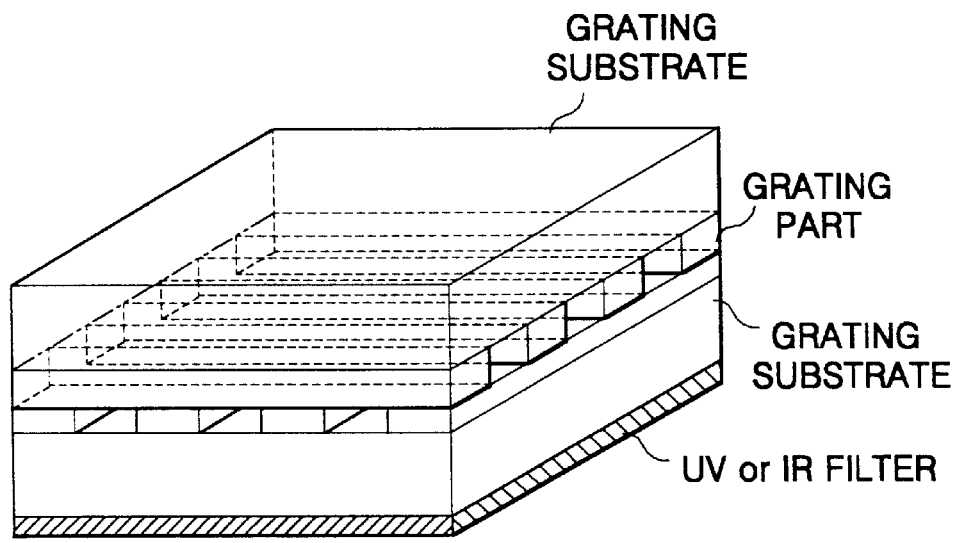
FIG. 13A is a schematic perspective diagram of a third embodiment of the rating structure of the optical phase grating low pass filter of the present invention, the phase grating being combined with an infrared or ultraviolet filter placed on the top or bottom thereof.
Figure 13B:
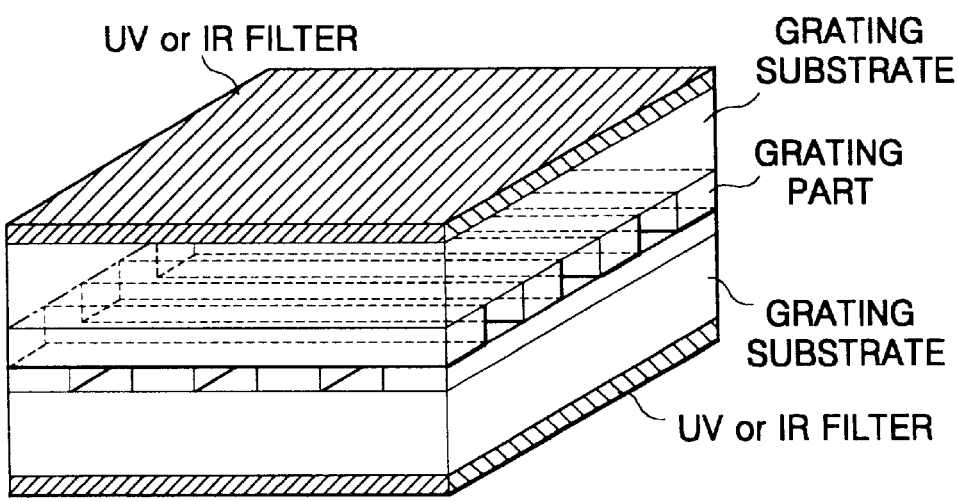
FIG. 13B is a schematic perspective diagram of the third embodiment of the grating structure of the optical phase grating low pass filter of the present invention, the phase grating being combined with infrared or ultraviolet filters placed on the top and bottom thereof.

In construction of an imaging system, the IR filter or UV filter is generally incorporated into the optical low pass filter. To incorporate the IR or UV filter into the optical phase grating low pass filter of the invention, a coating layer or filter plate for removing infrared (IR) rays or ultraviolet (UV) rays may be attached to one of the top and bottom of the grating substrate as shown in FIG. 13A. The coating layer or filter plate may also be attached to both of the top and bottom of the grating substrate as shown in FIG. 13B.

Another Embodiment of the Invention

Figure 14A:
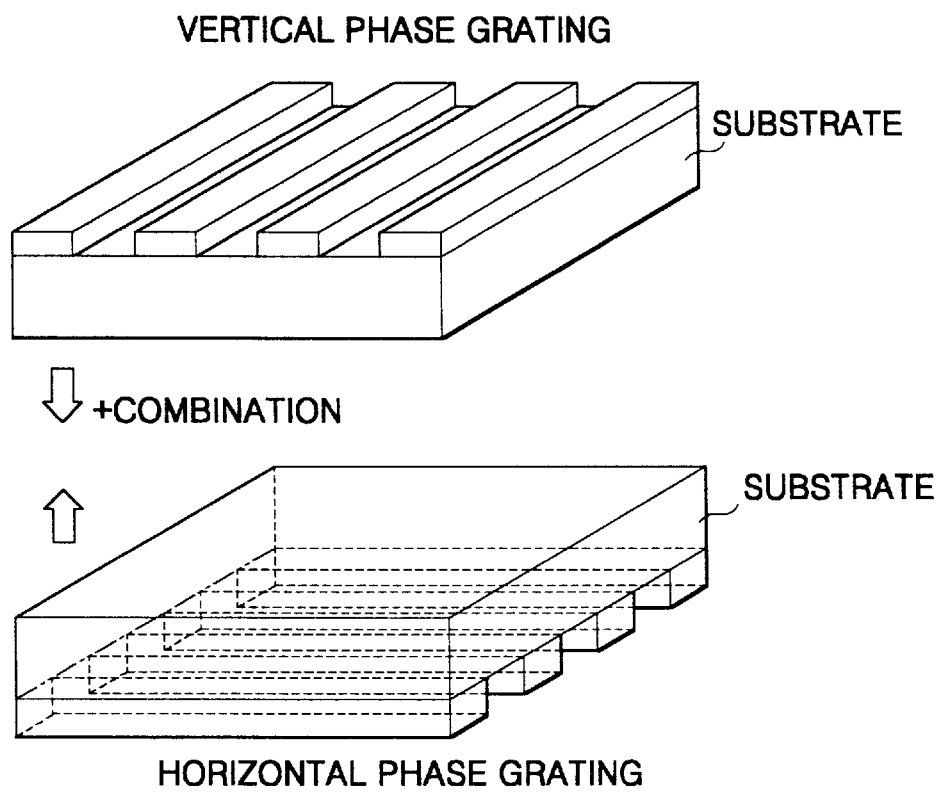
FIG. 14A is a schematic perspective diagram of a fourth embodiment of the grating structure of the optical phase grating low pass filter of the present invention before attachment.
Figure 14B:
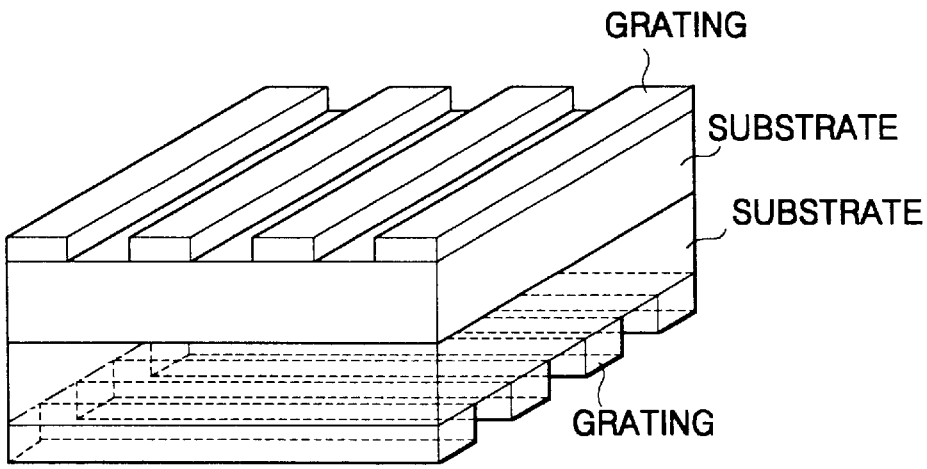
FIG. 14B is a schematic perspective diagram of the fourth embodiment of the grating structure of the optical phase grating low pass filter of the present invention after attachment.

FIGS. 14A and 14B show another configuration of the optical phase grating low pass filter of the present invention. To arrange the grating with the phase shifts 0, φ and 2φ as shown in FIG. 10, a grating for shifting the phase by φ is periodically arranged in parallel on a grating substrate in the direction y and a grating for shifting the phase by φ is periodically arranged in parallel on a grating substrate in the direction x, and the surfaces of these two grating substrates on which the gratings are not formed are attached to each other, facing each other, to thereby construct the optical phase grating low pass filter. The grating and the substrate are preferably fabricated with materials having the same refraction index.

FIG. 14A shows the gratings which are respectively arranged in the directions x and y, and FIG. 14B shows the grating structure after the two grating substrates are attached to each other. According to the attachment of the two grating substrates, a portion where light transmitted through the 0-phase grating passes through the 0-phase grating becomes a 0-phase shift grating part, a portion where light transmitted through the 0-phase grating passes through the φ-phase grating or light transmitted through the φ-phase grating passes through the 0-phase grating becomes a φ-phase grating part, and a portion where light transmitted through the φ-phase grating passes through the φ-phase grating becomes a 2φ-phase grating part.

When the phase shift grating of the invention is manufactured, the thickness of the grating may be changed a little during the fabrication process. Even in this case, however, the thickness variation does not obstruct practical application of the present invention if the phase shift error due to the grating is not larger than φ. Accordingly, a very small error of phase shift due to a minute variation in the grating's thickness does not depart from the basic spirit and scope of the present invention.

Figure 15:
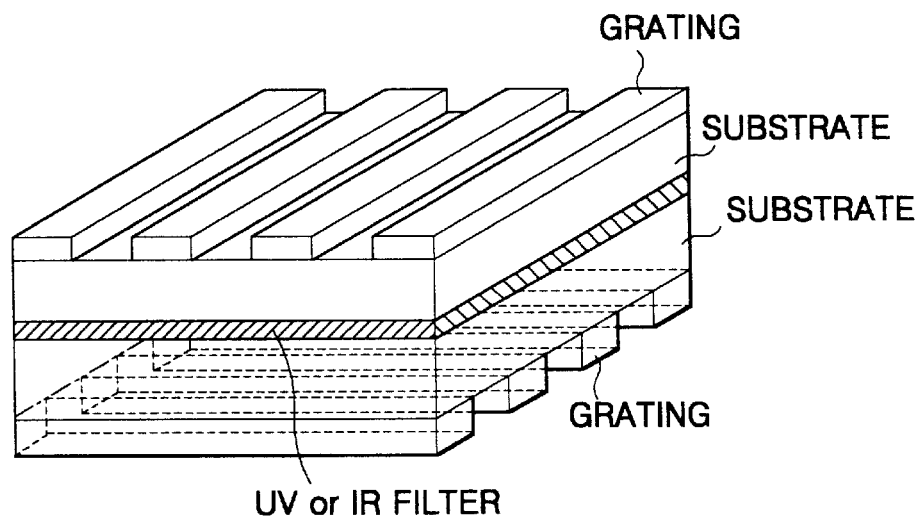
FIG. 15 is a schematic perspective diagram of a fifth embodiment of the grating structure of the optical phase grating low pass filter of the present invention.

In construction of an imaging system, the IR filter or UV filter is generally integrated into the optical low pass filter. To realize the combined structure of the phase grating filter of the present invention and the IR filter or UV filter, a coating layer or filter plate for removing IR rays or UV rays may be inserted between the upper and lower grating substrates as shown in FIG. 15.

Another Embodiment of the Invention

Figure 16:
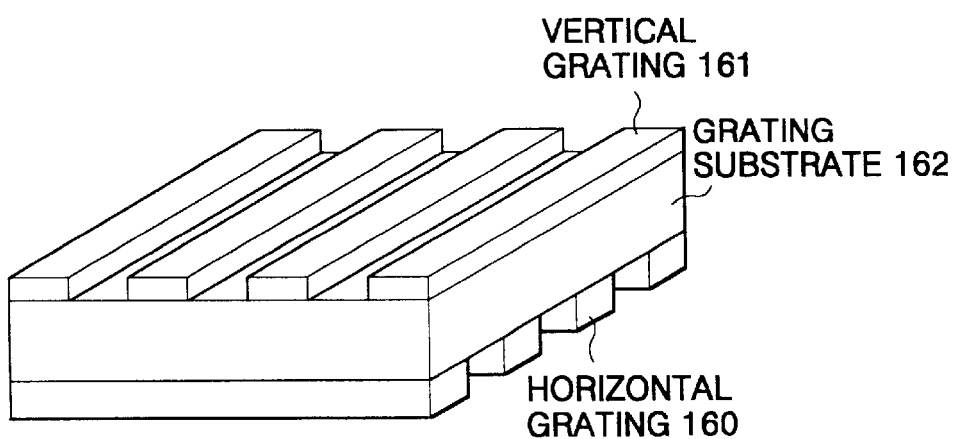
FIG. 16 is a schematic perspective diagram of a sixth embodiment of the grating structure of the optical phase grating low pass filter of the present invention.

FIG. 16 shows another structure of the optical phase grating low pass filter of the present invention. To arrange the grating with the phase shifts 0, φand 2φas shown in FIG. 10, a grating for shifting the phase by φ is periodically arranged in parallel on one side of a grating substrate in the direction y and a grating for shifting the phase by φ is periodically arranged in parallel on the other side of the grating substrate in the direction x, to thereby construct the optical phase grating low pass filter. The gratings and the substrate are preferably fabricated with materials having the same refraction index.

FIG. 16 shows the grating structure fabricated on the same substrate. According to this structure in which the two gratings are respectively arranged on the both surfaces of the substrate, perpendicular to each other, a portion where light transmitted through 0-the phase grating passes through the 0-phase grating becomes a 0-phase grating part, a portion where light transmitted through the 0-phase grating passes through the φ-phase grating or light transmitted through the φ-phase grating passes through the 0-phase grating becomes a φ-phase grating part, and a portion where light transmitted through the φ-phase grating passes through the φ-phase grating becomes a 2φ-phase grating part.

In construction of an imaging system, the optical low pass filter is generally combined with an IR filter or UV filter. In this embodiment, a material for removing ultraviolet rays or infrared rays is required to be coated on the surface of the grating because it is difficult to insert the coating layer or filter plate for removing the UV rays or IR rays into the substrates of the phase grating filter having gratings respectively formed on the top and bottom of the same substrate. However, the protrusion and depression of the surface of the grating makes it difficult uniform coating of the material. Accordingly, it is preferable that an optical lens arrangement including a separate filter for blocking the UV rays or IR rays is employed when the filter structure of this embodiment is applied to an imaging system.

The present invention provides the phase shift grating arrangement of the optical phase grating low pass filter and its grating structure. According to the embodiments of the present invention, it is possible to realize the optical low pass filter, which is an essential element for constructing an imaging system utilizing a solid-state imaging device, with the performance more excellent than that of the conventional one using a double refraction plate.

What is claimed is:

1. An optical low pass filter which suppresses a spatial frequency component higher than a specific frequency and passes a component lower than the specific frequency in an imaging system sensing input images, the optical low pass filter comprising:

a first grating for generating a phase shift of φ and a phase shift of 0, having a predetermined thickness and periodically arranged on one transparent grating substrate in a horizontal direction; and a second grating for generating a phase shift of φ and a phase shift of 0, having a predetermined thickness and periodically arranged on a second transparent grating substrate in a vertical direction, wherein surfaces of the first and second gratings are attached to each other facing each other, to thereby construct a structure in which a φ-phase shift element for generating a φ-phase shift, a 2φ-phase shift element for generating a 2φ-phase shift and a 0-phase shift element are periodically arranged between the first and second transparent grating substrates; and a filter for blocking UV rays is formed on one of the top face and the bottom face of the attached first and second transparent grating substrates, and a filter for blocking IR rays is formed on the other face.

2. An optical low pass filter which suppresses a spatial frequency component higher than a specific frequency and passes a component lower than the specific frequency in an imaging system sensing input images, the optical low pass filter comprising:

a first grating for generating a phase shift of $\phi$ and a phase shift of 0, having a predetermined thickness and periodically arranged on one transparent grating substrate in a horizontal direction; and a second grating for generating a phase shift of $\phi$ and a phase shift of 0, having a predetermined thickness and periodically arranged on a second transparent grating substrate in a vertical direction, wherein surfaces of the first and second grating substrates on which the gratings are not formed are attached to each other facing each other, to thereby construct a structure in which a $\phi$-phase shift element for generating a $\phi$-phase shift, a $2\phi$-phase shift element for generating a $2\phi$-phase shift and a 0-phase shift element are periodically arranged; and a filter for blocking UV rays and IR rays is inserted between attached surfaces of the first and second grating substrates.

3. An optical low pass filter which suppresses a spatial frequency component higher than a specific frequency and passes a component lower than the specific frequency in an imaging system sensing input images, the optical low pass filter comprising:

a first grating for generating a phase shift of $\phi$ and a phase shift of 0, having a predetermined thickness and periodically arranged on one transparent grating substrate in a horizontal direction; and a second grating for generating a phase shift of $\phi$ and a phase shift of 0, having a predetermined thickness and periodically arranged on the other transparent grating substrate in a vertical direction, wherein the surfaces of the first and second grating substrates on which the gratings are not formed are attached to each other facing each other, and a filter for blocking UV rays and IR rays is inserted between the attached surfaces of the grating substrates.

4. An optical low pass filter which suppresses a spatial frequency component higher than a specific frequency and passes a component lower than the specific frequency in an imaging system sensing input images, the optical low pass filter comprising:

a first grating for generating a phase shift of $\phi$ and a phase shift of 0, having a predetermined thickness and periodically arranged on one transparent grating substrate in a horizontal direction, and a second grating for generating a phase shift of $\phi$ and a phase shift of 0, having a predetermined thickness and periodically arranged on the other transparent grating substrate in a vertical direction, wherein the surfaces of the first and second gratings are attached to each other facing each other, defining a grating substrate structure, whereby shifting elements of the first grating and the second grating are periodically arranged between the first and second transparent grating substrates, and a filter for blocking UV rays is formed on one of the top face and the bottom face of the grating substrate structure, and a filter for blocking IR rays is formed on the other face.

* * * * *